United States Patent
Wilkie et al.

(10) Patent No.: US 11,590,744 B2
(45) Date of Patent: Feb. 28, 2023

(54) SHRINK FILM

(71) Applicant: Taghleef Industries, Inc., Newark, DE (US)

(72) Inventors: Andrew F. Wilkie, Avondale, PA (US); Anthony J. DeNicola, Jr., Old Lyme, CT (US)

(73) Assignee: TAGHLEEF INDUSTRIES INC., Newark, DE (US)

( * ) Notice: Subject to any disclaimer, the term of this patent is extended or adjusted under 35 U.S.C. 154(b) by 671 days.

(21) Appl. No.: 16/306,808

(22) PCT Filed: Jun. 1, 2017

(86) PCT No.: PCT/US2017/035406
§ 371 (c)(1),
(2) Date: Dec. 3, 2018

(87) PCT Pub. No.: WO2017/210403
PCT Pub. Date: Dec. 7, 2017

(65) Prior Publication Data
US 2020/0298541 A1 Sep. 24, 2020

Related U.S. Application Data

(60) Provisional application No. 62/344,149, filed on Jun. 1, 2016, provisional application No. 62/430,656, filed on Dec. 6, 2016.

(51) Int. Cl.
*B32B 27/32* (2006.01)
*B32B 27/08* (2006.01)

(52) U.S. Cl.
CPC .............. *B32B 27/32* (2013.01); *B32B 27/08* (2013.01); *B32B 2307/41* (2013.01); *B32B 2307/518* (2013.01); *B32B 2307/736* (2013.01); *B32B 2323/04* (2013.01); *B32B 2323/10* (2013.01); *B32B 2519/00* (2013.01)

(58) Field of Classification Search
CPC . B32B 27/32; B32B 2519/00; B32B 2323/10; B32B 2307/736; B32B 2307/518; B32B 2307/41; B32B 27/08; B32B 2323/04; B32B 2307/40; B32B 2307/514; B32B 2307/516; B32B 27/325; C08L 23/14; C08L 2203/16; B29C 55/02; B29C 55/06
See application file for complete search history.

(56) References Cited

U.S. PATENT DOCUMENTS

| | | | |
|---|---|---|---|
| 5,667,902 A * | 9/1997 | Brew | B32B 27/32 428/518 |
| 7,244,507 B2 | 7/2007 | Arthurs et al. | |
| 8,202,941 B2 | 6/2012 | Keung et al. | |
| 8,663,810 B2 | 3/2014 | Ambroise et al. | |
| 9,695,306 B2 | 7/2017 | Ambroise | |
| 2003/0054165 A1 | 3/2003 | Yamanaka et al. | |
| 2006/0073318 A1 * | 4/2006 | Tuttle | B32B 21/02 428/220 |
| 2006/0233984 A1 * | 10/2006 | Suzuki | C08J 5/18 525/88 |
| 2011/0212338 A1 | 9/2011 | Ambroise | |
| 2013/0095538 A1 | 4/2013 | Lu | |
| 2014/0159277 A1 | 6/2014 | Ambroise et al. | |
| 2015/0010740 A1 | 1/2015 | Chen et al. | |
| 2016/0340326 A1 | 11/2016 | Li et al. | |
| 2017/0174379 A1 * | 6/2017 | Mitchell | B29C 65/48 |

FOREIGN PATENT DOCUMENTS

| | | |
|---|---|---|
| CN | 1399661 A | 2/2003 |
| CN | 102196907 A | 9/2011 |
| CN | 104943309 A | 9/2015 |
| WO | 0138434 A1 | 5/2001 |
| WO | 03008184 A1 | 1/2003 |
| WO | WO 2010047905 | 4/2010 |
| WO | WO 2010047906 | 4/2010 |
| WO | 2013106114 A1 | 7/2013 |
| WO | 2015004316 A1 | 1/2015 |
| WO | WO 2015004316 | 1/2015 |
| WO | 2017210403 A1 | 12/2017 |

OTHER PUBLICATIONS

International Search Report for international application No. PCT/US2017/035409 dated Aug. 17, 2017.
Australian Examination Report for Australian Patent Application No. 2017273732, dated Jun. 11, 2020.
First Office Action and Search Report issued by the Chinese Patent Office dated May 9, 2020.
English Translation of First Office Action and Search Report issued by the Chinese Patent Office dated May 9, 2020.

* cited by examiner

*Primary Examiner* — James C Yager
(74) *Attorney, Agent, or Firm* — Caesar Rivise, PC

(57) ABSTRACT

Oriented, multilayer shrink films, either clear or opaque, comprise a core layer and at least one skin layer. The core layer has a thickness greater than the thickness of the at least one skin layer. The at least one skin layer comprises at least one cyclic-olefin copolymer as the predominant component thereof. The core layer comprises a blend of a polyolefin polymer and a polybutene-1 copolymer with ethylene, the butene-1 constituting over 75% by weight of the polybutene-1 copolymer. The film has a shrinkage of at least 20% in at least one of the machine and transverse directions of formation when said film is heated to a temperature of between 80 and 100° C. Optionally the films can include a propylene-based elastomer, a styrenic based block copolymer elastomer, reclaim including the components of the film, or combinations thereof.

38 Claims, No Drawings

SHRINK FILM

CROSS-REFERENCE TO RELATED APPLICATIONS

This US National Phase Application claims the benefit under 35 U.S.C. § 371 of PCT application no. PCT/US2017/035406 filed on Jun. 1, 2017 which in turn claims the benefit under 35 U.S.C. § 119(e) of Application Ser. No. 62/344,149 filed on Jun. 1, 2016 entitled SHRINK FILM and Application Ser. No. 62/430,656 filed on Dec. 1, 2016 entitled SHRINK FILM and whose entire disclosure is incorporated by reference herein.

BACKGROUND OF THE INVENTION

1. Field of Invention

This invention relates generally to shrink films and more particularly to multi-layer, oriented shrink films employing a cyclic olefin copolymer (COC) in at least one skin layer.

2. Description of Related Art

Shrink labels represent a significant percentage of labelling applications. Within this category, high shrink labels are the fastest growing segment because of the trend towards contoured containers and shrink sleeve labels with 360° graphics. There are two categories of shrink labels: roll-on-shrink-on (ROSO) labels and sleeve labels. Films from which ROSO labels are formed primarily shrink in the machine direction (MD) and generally employ biaxially oriented polypropylene (BOPP) films with shrink levels of generally less than 20%. Sleeve labels are solvent seamed into a tube and placed around a container. When heat is applied, the label preferentially shrinks in the direction extending circumferentially around the container. Sleeve labels primarily shrink in the transverse direction (TD) of film formation.

Current high shrink sleeve labels are made from TD shrink films (i.e., films with predominate shrinkage in the transverse direction of film formation). These films can provided 50% or more shrinkage and are usually made of polyvinyl chloride (PVC), polyethylene terephthalate (PET), polyethylene terephthalate glycol (PETG), polylactic acid (PLA) or oriented polystyrene (OPS).

PVC and PETG are the predominant shrink films in North America. These polymers contaminate the PET in labeled containers and in the recycling process must be separated. Since PETG and PET have similar characteristics, there is no elegant way to segregate them. Recyclers and brand owners are interested in preserving the value of recycled PET employed in the fabrication of containers. A shrink label that floats in water allows easy separation from PET bottles and preserves the recyclability of the container. However, prior art label structures employing PVC, PET, PETG, PLA and OPS all have densities in excess of 1 g/cm$^{-3}$; making it difficult to separate the labels from the containers to which they are attached during a recycling process. In other words, they are not floatable. In addition, there is a push to avoid PVC packaging because of environmental concerns.

OPS offers low cost and high shrinkage, but optics and rigidity are poor.

Numerous patents and published applications disclose a variety of polyolefin-based shrink films employing cyclic-olefin copolymer (COC) in at least one skin layer. (Cyclic olefin copolymers are chain copolymers of cyclic monomers such as norbornene or tetracyclododecene with ethylene.) Exemplary patents and published applications are:

U.S. Pat. No. 7,244,507
U.S. Publication 2015/0010740
U.S. Publication 2013/0095338
U.S. Pat. No. 8,202,941
U.S. Publication 2011/0212338
U.S. Publication 2014/0159277
U.S. Pat. No. 8,663,810
PCT Publication WO 2015/052246
EP application 2,355,978 (Based on WO 2010/047905)
EP application 2,355,979 (Based on WO 2010/047906)

The '507 patent discloses three to five layer, biaxially oriented structures employing silicone-free surfaces for providing improved hot slip performance. The core layers employ polyethylene based polymers and the outer layers can be polyethylene based or polypropylene based polymers including COC as a minor component thereof; possibly being used as an antiblock. A terpolymer is employed in some of the disclosed structures but only in the skins.

The '740 publication discloses three to seven layer, uniaxially oriented structures with the orientation in the machine direction to provide MD shrink. The disclosed films can include COC in the skin layers, and the core layer includes polyolefin polymers, such as polypropylene random copolymers. Films employing COC in the blend did not have desired haze values.

The '095338 publication disclosed preferentially transverse direction oriented, multilayer films that can employ COC in the skin or tie layers, and specified polyolefin based polymers in the core layer.

The '941 patent discloses biaxially oriented films having an undesirably low shrink; the highest disclosed shrink being 17% at 120° C. The disclosed examples are basically three layer structures with a core that is a blend of minirandom polypropylene (0.55% C2), hard resin and metallocene random copolymer and skin layers that include high ethylene random copolymer.

The '212338 publication discloses multilayer shrink films with a core layer comprising one or more alpha olefin polymers and at least one skin comprising one or more cyclic olefin polymers or amorphous polyesters or polylactic acids. Core layers generally comprise propylene and ethylene homopolymers and copolymers and combination thereof. Core layers include propylene based elastomers (such as Vistamaxx and Versify polymers), metallocene catalyzed copolymer of propylene and ethylene, ethylene based plastomers (such as Exact, Affinity, and Tafmer), and metallocene based LLDPE or combinations thereof.

The '277 publication discloses multilayer shrink films with a core layer comprising one or more alpha olefin polymers and at least one skin comprising one or more cyclic olefin polymers or amorphous polyesters or polylactic acids. Propylene and ethylene homopolymers and copolymers and combination thereof are usually used for the core layer. Core layers can include propylene based elastomers (such as Vistamaxx and Versify polymers), ethylene based plastomers (such as Exact, Affinity, and Tafmer), and metallocene based LLDPE or combinations. Copolymer of propylene with ethylene and optionally butene (copolymer or terpolymer) with a melting point below 145° C. also are generally disclosed.

The '810 patent discloses multilayer shrink films with a core layer comprising one or more alpha olefin polymers and at least one skin comprising one or more cyclic olefin polymers or amorphous polyesters or polylactic acids. Propylene and ethylene homopolymers and copolymers and combination thereof are disclosed as being usually used in the core layer. Core layers can include propylene based elastomers (such as Vistamaxx and Versify polymers), ethylene based plastomers (such as Exact, Affinity, and Tafmer), and metallocene based LLDPE or combinations. Copolymer of propylene with ethylene and optionally butene (copolymer or terpolymer) with a melting point below 145° C. is disclosed as being useable in core layer.

The '246 international publication disclosed a machine direction oriented multilayer film suitable for use in labels. The structure includes a core layer of a bimodal terpolymer and two outer layers comprising high density polyethylene (HDPE).

The '978 European applications disclose multi-layer shrink films in which the core layer can include propylene based elastomers, metallocene catalyzed copolymers of propylene and ethylene, ethylene plastomers, metallocene catalyzed linear low density polyethylene and combinations thereof.

The '979 European application discloses heat shrink films in which a central layer consists of specified alpha-olefin polymers and combinations thereof in specified percentages. Specifically identified are propylene based elastomers, ethylene based plastomers, metallocene catalyzed linear low density polyethylenes and combination thereof.

The combination of polymers disclosed for use in the core layer of the shrink films disclosed in the '978 and '979 European applications is unrelated to, and does not suggest, the combination of polymers employed in the core layer of the multilayer films and labels of the present invention, as described in greater detail hereinafter.

Prior art patents and publications disclose the use of a cyclic-olefin copolymer in one or both of the skin layers in multilayer films; a number of such films having an undesired high density in excess of 1. Although cyclic-olefin copolymers (COC) have the capability of significantly shrinking at temperatures at or below 100° C. the properties of the core layers of such prior art structures have limited the amount of shrinkage obtainable in multilayer films including COC in one or both of the skin layers. High shrinkage in excess of 20%; more preferably in excess of 35% and most preferably in excess of 50% is desirable in film structures employed to form shrink labels. These shrinkage levels in a desired shrink temperature range of 85-100° C. together with acceptable optical properties (haze below 5%) and density below 1.0 grams/cc have been difficult to obtain in prior art structures. Moreover, the core layers in prior art structures have different stretch temperature ranges than the skin layers; providing only a limited window in which the ranges overlap to achieve stretching. Providing the desired clarity in conjunction with the desired shrink values makes such films useful in the formation of clear, shrink labels; particularly sleeve labels.

The multilayer films of the present invention overcomes a number of the deficiencies in the prior art, shrink film structures; making the films of this invention highly desirable for use in forming both clear and opaque label structures. The films of this invention exhibit a very attractive balance of properties and processability.

All references cited or discussed herein are incorporated herein by reference in their entireties.

BRIEF SUMMARY OF THE INVENTION

An oriented, multilayer shrink film of this invention includes a core layer and at least one skin layer, said core layer having a thickness greater than the thickness of the at least one skin layer.

At least one skin layer comprises at least one cyclic-olefin copolymer as the predominant component thereof, and the core layer comprises a blend of a polyolefin and a butene-1 copolymer with ethylene, the butene-1 constituting over 75% by weight of the butene-1 copolymer. The film has a shrinkage of at least 20% in at least one of the machine and transverse directions of formation when the film is heated to a temperature of between 80 and 100° C.

In the most preferred embodiments the film has a density of less than 1 $g/cm^3$. When used as a label on plastic bottles or containers, a density of less than 1 $g/cm^3$ permits its easy separation from the higher density bottles or containers to enhance its recyclability. However, where recyclability is not a major consideration a film having a higher density is within the scope of this invention.

In the preferred embodiments the film is oriented in at least one direction, most preferably with the greatest orientation being in the transverse direction of formation.

In the most preferred embodiments of this invention the film is uniaxially oriented. If a voiding agent is included in the structure to provide opacity it may be more desirable to biaxially orient the film to aid in creating voids and reducing density of the film.

In one embodiment the oriented, multilayer film is a clear film having a haze of less than 5% and a density of less than 1 $g/cm^3$.

In another embodiment the oriented, multilayer film is an opaque film; provided by the inclusion of a voiding agent and/or a non-voiding, opacifying agent in one or more of the layers. Opaque films provided by the inclusion of an opacifying agent often will have a density greater than 1 $g/cm^3$.

In preferred embodiments of the oriented, multilayer shrink films the olefin polymer combined with the polybutene-1 copolymer is not a polybutene-1 copolymer.

In the most preferred embodiment of the oriented, multilayer shrink film the polyolefin combined with the polybutene-1 copolymer is a propylene based polymer.

In a preferred embodiments of the oriented, multilayer shrink film of this invention the polyolefin is a terpolymer; most preferably a propylene-ethylene-1-butene terpolymer with propylene constituting the major component by weight of the terpolymer.

In accordance with preferred embodiments of this invention the oriented, multilayer shrink film includes three or more layers; including a core layer and a skin layer on each side of said core layer. The skin layers can be essentially identical or different in thickness and composition. Embodiments with similar or essentially identical compositions and thicknesses are preferred to prevent undesired curling of the film.

In a preferred embodiment of this invention the oriented, multilayer shrink film has shrinkage in one direction of formation, most preferably the transverse direction of formation, of at least 30%, and more preferably at least 50% when heated in the temperature range of 90-100° C. Most preferably at least 50% shrinkage in at least one direction, preferably the transverse direction of formation, is achieved in the temperature range of 93-97° C.

In another embodiment of this invention the oriented, multilayer shrink film includes a hard resin, also known as hydrocarbon resin, in the core layer; most preferably a dicyclopentadiene-based hard resin. Although the inclusion of a hard resin in the core does not materially affect the shrink properties of the film it does desirably increase film modulus and tensile strength in both the machine direction and transverse direction of film formation.

In other embodiments of the invention the core layer preferably employs propylene terpolymer and butene-1 copolymer, and additionally can include shrink film reclaim, propylene elastomeric copolymers (with ethylene) and styrenic triblock (S-E/B-S) copolymer elastomers, alone or in combination. (S-EB-S are styrene-block-butadiene-block-styrene triblock copolymers with their butadiene block selectively hydrogenated.) Incorporating these additional components into the film core provides several beneficial improvements. In particular, the inclusion of the elastomeric copolymers improves Z-Axis strength, which is highly desirable in labels formed from such films. "Z-Axis Strength" is the measure of the interlaminar strength of a film specimen.

In a preferred embodiment of the film employed for label applications the core layer includes propylene terpolymer in the range of 10-80% by weight and more preferably in the range of 30-75% by weight; butene-1 copolymer in the range of 20-50% by weight and more preferably in the range of 25-40% by weight and an elastomeric copolymer in the range of 5-40% by weight and more preferably in the range of 15-35% by weight. This polymer blend provides a highly desirable film construction for use in label applications.

In preferred embodiments when reclaim is employed in the core layer the reclaim includes a propylene terpolymer, 1-butene copolymer and COC; most preferably the reclaim is from the same film structure being formed and includes the components in the skins and core layer that are the same as the film being formed with the reclaim in it. This provides for an effective use of reclaim.

In preferred embodiments of this invention the cyclic-olefin copolymer in at least one skin layer includes a copolymer of ethylene and norbornene.

In a preferred embodiment at least one skin layer includes one, or a blend of several, cyclic-olefin copolymers selected to provide a glass transition temperature Tg providing a broad orientation processing window that ensures a high level of line continuity in the stretching process. Preferred cyclic-olefin copolymers or blends of cyclic-olefin copolymers provide a Tg in a range of 60 to 80° C., more preferred between 65 and 75° C. By way of example, blends of cyclic-olefin copolymers based on a first cyclic-olefin copolymers providing a Tg in a range of 50 to 70° C. and a second cyclic-olefin copolymers providing a Tg in a range of 70 to 90° C. have been found suitable for this purpose.

In accordance with this invention the overall thickness of oriented films employed to form bottle labels can range from about 12 microns ($12 \times 10^{-6}$ m) to about 75 microns.

In the most preferred embodiments of this invention the film is a multilayer film including a core layer and opposed skin layers.

To provide the desired shrinkage, preferably, the minimum skin thickness on one or both surfaces is greater than 9% of the overall film thickness; more preferably greater than 10% of the overall film thickness; even more preferably greater than 12% of the overall film thickness and most preferably in excess of 13% of the overall film thickness. The thickness of one or both skins is dictated by the desired shrink and stiffness, or rigidity, of the film. Thicker skins generally increase shrinkage and also reduce the low load elongation at room temperature and at 125° F. (51.7° C.). However, thicker skins tend to increase the density of the film. Therefore, when low densities are desired, e.g., a density less than 1 g/cm$^3$, maximum skin thickness needs to be controlled but still be maintained above the preferred minimum.

In a representative embodiment of this invention oriented, multilayer shrink film of this invention including at least three layers, a core layer has a thickness of at least 20 microns (more preferably in the 30-35 micron range) and each of the opposed skin layers has a thickness that preferably is greater than 5 microns, and more preferably greater than 6 microns.

Preferably the films of this invention have directional shrink at 95° C. as high as 65%. In a more preferred embodiment, the films have a density less than 1.0 g/cm$^3$. Most preferred are films which are essentially free from opacifying agents and that have a haze of less than 5%, preferably with clarity greater than 60% in combination with a density less than 1.0 g/cm$^3$. In addition, films of this invention provide high stiffness, low natural shrink and minimal elongation under low load, which enhances printability of the film; a desired feature when the film is used in printed labels or similar printed applications.

This invention also includes container labels made from the oriented, multilayer shrink films of this invention.

Most preferably a container label of this invention is in the form of a sleeve having a circumferential dimension configured to surround a periphery of a container and a transverse direction substantially normal to said circumferential direction, said circumferential dimension being the dimension with the greatest shrinkage when said label is heated to a desired temperature; preferably no greater than 100° C. to effect shrinkage. The COC in the skin layers, which is amorphous, permits effective solvent seaming, which is highly desirable in sleeve labels. In the preferred embodiment the label is formed from a film in which the TD of film formation is the direction of greatest shrinkage, and this transverse direction of formation constitutes the circumferential direction of the label surrounding the container.

Most preferably the circumferential dimension of the container label is the transverse dimension of formation of the oriented, multilayer film from the label is formed.

Most preferably the films of this invention have high stiffness, little elongation under low load, low natural shrink together with directional shrink at 95° C. as high as 65%. Providing low natural shrink and minimal elongation under low load minimizes distortion of the film as it is exposed to the stresses and temperatures normally associated with the printing process. Low distortion leads to better print quality; a highly desired property in applications wherein the film is to be printed with identifying indicia.

In a more preferred embodiment, the labels made from films of this invention have a density less than 1.0 g/cm$^3$. Most preferred are labels that are essentially free from opacifying agents, that have a haze of less than 5%, preferably with clarity greater than 60% and that have a density of less than 1.0 g/cm$^3$ to facilitate easy separation from PET containers during recycling after use.

DEFINITIONS

Unless specified otherwise the following terms shall have the specified meanings:

"Olefin polymer" means a homopolymer, copolymer or terpolymer in which all of the monomer units in such polymers being olefins.

"Propylene polymer" means a propylene homopolymer, or a copolymer or a terpolymer in which the predominant monomer component, by weight is propylene.

"Propylene terpolymer" means a propylene, ethylene, butene terpolymer in which propylene is the predominant monomer unit by weight.

"Polypropylene homopolymer" includes, in addition to a homopolymer, a polypropylene-ethylene copolymer in which the percentage of ethylene is so little that it doesn't adversely affect the crystallinity or other properties of the propylene homopolymer. These copolymers are referred to as "minirandom" copolymers and have a percentage of ethylene, by weight of the copolymer, of 1% or less.

"Percent shrinkage" in referring to the shrinkage of a film or a label formed from such film is calculated in accordance with the following formula:

$$\frac{(\text{Dimension prior to shrinkage} - \text{Dimension after shrinkage})}{\text{Dimension prior to shrinkage}} \times 100$$

"Haze" is reported as a percentage and is determined in accordance with ASTM D1003 test method.

"Clarity" is reported as a percentage and is determined in accordance with ASTM D1746 test method.

"Density" of the film or label formed therefrom is determined by the displacement procedure of ASTM D792 test method.

"Flexural Stiffness" measures the stiffness or bending resistance of plastic films using an MTS/Sintech Q-Test Model QT-5 or similar instrument, a 2N (200 g) load cell, a triangular shaped stirrup attached to the load cell and a film holding fixture with a 1 inch wide channel which holds the film in the form of an arc. Film sample length is 4 inches with width between 1 and 4 inches. Crosshead speed is 12 inches/min with maximum compressive force required to bend the film sample at the center of the arc being measured. Results are reported as grams per inch width. (peak grams divided by sample width in inches).

"Gloss" of the film or label formed therefrom is determined in accordance with ASTM 2457 test method. Gloss in refers to the gloss of the inside surface of the produced mill roll and gloss out refers to the gloss of the outside surface of the produced mill roll.

"MD" and "TD" refer to the machine direction and the transverse direction in the manufacturing process, respectively.

"MD Gurley stiffness" of the film or label formed therefrom was determined in accordance with ASTM D6125 test method.

"Tensile strength at break" of the film or label formed therefrom is determined in accordance with ASTM D882 test method.

"Tensile modulus" of the film or label formed therefrom is determined in accordance with ASTM D882.

"Low Load Elongation" (LLE) of the film or label formed therefrom reports the low load properties of the film; identifying the percent elongation at specific loads. Test specimens in the form of strips 25.4 mm (1 inch) wide and 127 mm (5 inches) long are cut from the sample and placed in the grips of an Instron Load Frame equipped with a 2.27 kg (5 pound) tension load cell and 50.8 mm (2 inch) wide sample grips. The jaw speed is set at 50.8 mm/min (2.0 in./min.) and the elongation is determined at each increment of 0.11 kgf (0.25 pounds of force) applied to the film sample in tension for the entire range of 0.11 to 0.91 kgf (0.25 to 2.0 pounds of force). The test can be conducted at room or elevated temperature.

"TD shrink tension" of the film or label formed therefrom is determined in accordance with ASTM D2838 test method.

"MD and TD shrink" is determined in hot oil as a function of temperature in accordance with ASTM D1204 test method.

"Natural shrink" of the film is the unconstrained % shrink of a film sample at a prescribed temperature after a defined period of time. As described in the following examples, sample hand sheets, typically 8.5 inches (21.6 cm) by 11 inches (27.9 cm) are cut from the roll in the TD direction. The sample is placed without constraints in a hot air oven set at the prescribed temperature (typically 40° C., and/or 50° C.) for 24 hours. Samples dimensions in the MD and TD direction are measured before and after heat exposure and the percentage shrink is calculated from the change in the measured dimensions.

"Room Temperature (RT) Coefficient of Friction (COF)" of the film or label formed therefrom is determined in accordance with ASTM D1894 test method.

"Yield" is the coverage in square inches/pound (in.$^2$/lb.) and is determined in accordance with ASTM D4321 test method.

"Dynes/Wetting Tension" is determined in accordance with ASTM 2578 test method.

"Z Axis Strength" is the measure of the inter-laminar strength of a film specimen, and covers measurement of the forces exerted when a specimen is pulled apart in the Z direction (i.e., through the cross-section). Scotch 610 tape (1 inch width and 8 inches long) is applied to both sides of the film specimen with moderate pressure to ensure that the tape has adhered to the sample on both sides. The two tapes are initially pulled apart manually to initiate inter-laminar failure. Once the z-axis failure has been initiated, the two tape tabs of the sample are placed in a MTS Q-Test/1 L tensile tester or similar instrument (25N cell) and separated at a cross head speed of 35 inches/minute. The peak and peel force is recorded and reported as grams per inch of width. If the sample does not initiate or fail by inter=laminar separation, it is reported as "could not delaminate".

DETAILED DESCRIPTION OF THE INVENTION

The present invention relates to multilayer oriented shrink films with a core layer and at least one skin layer. The core layer comprises a blend of a olefin polymer and at least one butene-1 copolymer. Preferably the olefin polymer is a propylene polymer and most preferably a propylene terpolymer including predominately propylene with lesser weight percentages of ethylene and butene monomer units. Preferably the polybutene-1 copolymer is a copolymer with ethylene and the butene-1 monomer constitutes over 75% by weight of the copolymer. The at least one skin layer includes at least one cyclic olefin copolymer (COC). These films are useful for the manufacture of labels, in particular solvent seamed sleeve labels, with shrink to conform to the shape of the container when heated at temperatures compatible with those encountered in a steam tunnel.

In the most preferred embodiments, when the films are employed in the formation of labels for attachment to containers and bottles, it is desirable to form the films with a density less than 1 g/cm$^3$; most preferably significantly below 1.0 g/cm$^3$, e.g., less than 0.96 and more preferably less than 0.94. This permits the labels to be easily separated from the containers or bottles to enhance recyclability. However, in applications where separation for a heavier article is not desired or required the films of this invention may have a density greater than 1 g/cm$^3$ Also, when opaque films are formed with the addition of an opacifying agent, such as $TiO^2$, as opposed to a voiding agent, it may be difficult to achieve a density of less than $1/g/cm^3$.

The films from which the labels of this invention are formed also may be used as high shrink packaging films, as well as for other applications.

Combinations of propylene terpolymer (with ethylene and butene) with butene-1 copolymers (with ethylene), with the optional addition of hard resin, when used in the core structure of a multilayer film with skins comprising one or more cyclic olefin copolymers exhibit a very attractive balance of properties and processability. A very attractive balance of properties and processability also can be obtained by the optional inclusion in the core layer of shrink film reclaim from the film forming process, propylene elastomeric copolymers (with ethylene), and Styrenic triblock (S-E/B-S) copolymer elastomers, alone or in combination. The inclusion of elastomeric copolymers in the film enhances Z-direction strength of the film, which is very desirable when the film is used in shrink label applications and also for other applications.

In accordance with preferred embodiments of this invention the films and labels made from these films have high stiffness, minimal elongation under low load, low natural shrink together with directional shrink in excess of 50% in the temperature range of 93-97° C.; more preferably in the range of 94-96° C., and a density less than 1.0 $g/cm^3$ to facilitate easy separation of formed labels from PET containers during recycling after use, Providing films of this invention with low natural shrink and minimal elongation under low load minimizes distortion of the film as it is exposed to the stresses and temperatures normally associated with the printing process. Low distortion leads to better print quality. For ease of discussion only properties of the film may be described/identified; it being understood that the labels formed from such film, prior to shrinkage, will essentially have the same properties as the film from which they are formed.

In accordance with this invention the film has shrinkage in excess of 20%; more preferably in excess of 35% and most preferably in excess of 50% at temperatures in the range of 85-100° C. Directional shrink exceeding 50% in the transverse direction of formation desirably is achieved at a temperature no higher than 100° C. and most preferably at a temperature no higher than 95° C. A most desirable operating temperature range for effecting shrinkage in excess of 50% is 93-97° C. High shrink exceeding 50% is very desirable for shrink labels intended to be secured about profiled containers having a substantial variation in thickness along the length thereof.

A representative film within the scope of the most preferred embodiments of this invention has a density of 0.91-0.95 $g/cm^3$. It has high COC content skins that facilitates shrink, permits solvent seaming and provides the desired gloss and rigidity. It has a core including a combination of propylene terpolymer and polybutene-1 copolymer, with or without hard resin, enhancing shrinkage without detracting from film clarity in clear films. Although the inclusion of hard resin does not have a measurable effect on the shrink properties of the film it does desirably increase film modulus and tensile strength in both the machine direction and transverse direction of film formation. At least one side is oxidatively treated, e.g., corona treated for printing. The overall thickness is approximately 50 μm but that can vary within a typical range for bottle label films (e.g., 12 μm to 75 μm; more preferably from 20-60 μm and even more preferably from 30-50 μm).

In films having an overall thickness of 50 μm, skin thicknesses within the range of from greater than 4.6 μm to 8.5 μm have been employed; more preferably greater than 5 μm and most preferably greater than 6 μm. A skin thickness exceeding 8.5 μm may also be employed, however, based on current findings this simply adds to the density of the film with no perceivable added benefits. Providing skin thicknesses outside of this range can have an adverse effect on the shrinkage properties of the films, as well as labels formed from such films. In accordance with the broadest aspects of this invention the skin thicknesses can be varied; such thickness not constituting a limitation on the broadest aspects of this invention. Individuals of ordinary skill in the art can determine the desired balance of film thickness, core thickness and skin thickness to achieve the desired balance of properties of the shrink films of this invention.

Representative three layer film structures in accordance with this invention are identified below. In accordance with broader aspects of this invention the films can include more than three layers, e.g., five or seven layers. In the most preferred applications the films desirably have a density of less than 1.0 $g/cm^3$.

Example 1

This is a three layer structure having a thickness of 50 μm; the core layer being 33 μm and each of the opposed skin layers being 8.5 μm. The formulation employed in this film is shown diagrammatically below.

Corona Treated—Printable Skin Layer

| | |
|---|---|
| 8.5 μm Outer Skin layer | 20-100% Topas COC 8007F-600 (or Topas 8007F-04) 0-80% Topas COC 9506F-500 |
| 33 μm Core | 50-80% LYB Adsyl 6C30F or 7410XCP Terpolymer 20-40% LYB Koattro DP8310M (or Toppyl DP8220M) Polybutene-1 copolymer |
| (optional) | 0-10% Schulman CPS606 Hard Resin Concentrate or equivalent (optional) |
| 8.5 μm Inner Skin layer | 20-100% Topas COC 8007F-600 (or Topas 8007F-04) 0-80% Topas COC 9506F-500 |

Optionally Corona Treated
Polymers

COC Blends—Topas 8007F-04 is a cyclic-olefin copolymer (COC). Topas 8007F-600 and 9506F-500 are cyclic-olefin copolymers (COC) incorporating a minor component of linear low density PE. The identified cyclic-olefin copolymers are copolymers of ethylene and norbornene polymerized with a metallocene catalyst. COC provides stiffness and promotes solvent seaming, as well as contributing to the shrink performance of the film. The 8007F grades from Topas have a density of 1.02 $g/cm^3$, a Tg of 78° C., and a melt flow rate (230° C., 2.16 kg) of 11 dg/min. The 9506F grades from Topas have a density of 1.02 $g/cm^3$, a Tg of 65° C. and a melt flow rate (230° C., 216 kg) of 5.4 dg/min. Other COC's are considered possibly to be useable in this invention, e.g., APEL8008T from Mitsui Chemical. Individuals skilled in the art can easily determine, without an undue amount of experimentation, COC's usable in this invention.

Propylene Terpolymer—LyondellBasell Adsyl 6C30F and Adsyl 7410XCP are Ziegler-Natta catalyzed random terpolymers of propylene, ethylene, and butene; propylene being the predominant component, by weight therein. Adsyl 6C30F has a melt flow rate (230° C., 2.16 kg) of 5.5 dg/min, a SIT of 98° C., and a DSC peak melting point of 126° C. Adsyl 7410XCP has a melt flow rate (230° C., 2.16 kg) of 5.5 dg/min, a SIT of 75° C., and a DSC peak melting point of 125° C. In the preferred embodiment the terpolymer is a primary component of the core and provides high clarity. Moreover it is a contributing factor to high shrink performance within the most desired temperature range requirement of heat shrink label applications (90-100° C.). This typically is the temperature range in steam tunnels employed to shrink labels onto a container.

Polybutene Copolymer—LyondellBasell Koattro DP8310M and Toppyl DP8220M are Polybutene-1 copolymers with ethylene. Koattro DP8310M has a melt flow rate (190° C., 2.16 kg) of 3.5 dg/min, a melting point of 94° C., and a density of 0.897 g/cm$^3$, and is characterized as having a high ethylene content. Toppyl DP8220M has a melt flow rate (190° C., 2.16 kg) of 2.5 dg/min, a melting point of 97° C., and a density of 0.901 g/cm$^3$ and is characterized as having a medium ethylene content. In the preferred embodiments of this invention the polybutene-1 is a primary component of the copolymer; constituting over 75% by weight of the copolymer, and is an important contributing factor to obtaining high shrink performance within the preferred heat temperature range requirement of heat shrink label applications (90-100° C.).

Hard Resin—Schulman CPS606 is a 60% concentrate of Oppera™ 100 dicyclopentadiene based hard resin in a polypropylene carrier. The concentrate is provided by A. Schulman, located in Akron, Ohio, and the Oppera™ 100 hard resin is supplied by ExxonMobil Chemical, headquartered in Spring, Tex. The hard resin component has a softening point of 138° C. The inclusion of a hard resin improves processability, tensile strength and modulus, and has a minor effect on increasing shrink performance. In accordance with the broadest aspects of this invention, the inclusion of a hard resin in the core is not considered to be essential.

The skins are thick; preferably in the range of 4.5 to 8.5 microns; preferably over 5.0 microns and more preferably over 6 microns to avoid a loss in shrink performance in films having an overall thickness of approximately 50 microns. In uniaxially orienting the film in the TD the draw ratio in the MD (MD orientation or "MDO"), if any, is less than 1.3× and the TD draw ("TDO") is carried out within the range of about 5.5× to about 8.6×.

In accordance with this invention films manufactured with a draw ratio of less than 1.3× in one of the MD or TDs and a greater draw in the opposed direction are considered to be uniaxially oriented in such opposed direction. Films having a draw greater than 1.3× in both the MD and TDs are considered to be biaxially oriented in accordance with this invention.

Example 2

In this film, which was made on a pilot line, the core layer included 20% Polybutene-1 copolymer (DP8310M) blended with 9% hard resin (CPS 606) and 71% propylene terpolymer (Adsyl 6C30F). Both the inner and outer skins were of identical composition; including a 50-50 blend of two different COC (COC 8007F-400 and COC 9506F-04) with different glass transition temperatures (78° C. and 65° C., respectively) in order to reduce the softening point of the skin to provide better overlap of stretching behavior with the core in the oven. Five samples were investigated in this Example; made with a TD draw ratio of 7.4× at TDO temperatures of 112, 110, 108, 106 and 104° C., respectively. The formulation of the five samples was identical; as graphically depicted below:

Inside Mill Roll: No Oxidative Treatment 8.5 μm 50% Topas COC 8007F-400 + 50% Topas COC 9506F-04 Inside layer
30-33 μm 71% Adsyl 6C30F + 9% CPS 606 + 20% DP8310M
8.5 μm 50% Topas COC 8007F-400 + 50% Topas COC 9506F-04 Print layer Outside Mill Roll: Corona Treatment
The results of the film testing as a function of TDO temperature is given as follows:

| | Core | | | | | | | | | |
|---|---|---|---|---|---|---|---|---|---|---|
| | Skin | | | | | | | | | |
| | 71% Adsyl 6C30F + 9% CPS 606 + 20% DP8310M | | | | | | | | | |
| | 50% Topas COC 8007F-400 + 50% Topas COC 9506F-04 | | | | | | | | | |
| EXAMPLE 2 | SAMPLE 1 | | SAMPLE 2 | | SAMPLE 3 | | SAMPLE 4 | | SAMPLE 5 | |
| TDO Temp (° C.) | 112 | | 110 | | 108 | | 106 | | 104 | |
| Thickness | 195 | | 189 | | 188 | | 194 | | 204 | |
| Gauge (Microns) | (49.53) | | (48.01) | | (47.75) | | (49.28) | | (51.82) | |
| Yield (in$^2$/lb.) | 15,665 | | 16,331 | | 16,161 | | 15,844 | | 14,943 | |
| Density (g/cm$^3$) | 0.913 | | 0.919 | | 0.925 | | 0.919 | | 0.914 | |
| % Haze | 5.7 | | 5.0 | | 3.2 | | 2.0 | | 2.1 | |
| % Clarity | 49 | | 50 | | 60 | | 71 | | 68 | |
| 45° Gloss In | 78 | | 79 | | 83 | | 92 | | 91 | |
| 45° Gloss Out | 74 | | 79 | | 83 | | 91 | | 91 | |
| Treatment Dynes/cm (I/O) | 31/47 | | 30/53 | | 31/55 | | 31/54 | | 31/56 | |
| % Shrinkage | MD | TD | MD | TD | MD | TD | MD | TD | MD | TD |
| 24 hrs. @ 40° C. | 0.0 | 1.0 | 0.0 | 1.0 | 0.0 | 1.5 | 0.0 | 1.3 | 0.3 | 1.5 |
| % Shrinkage 10 sec in oil | MD | TD | MD | TD | MD | TD | MD | TD | MD | TD |
| 80° C. | 1.0 | 18 | 1.0 | 19 | 1.0 | 18 | 1.0 | 23 | 1.0 | 20 |
| 85° C. | 1.0 | 23 | 1.0 | 26 | 1.0 | 24 | 0.0 | 30 | 1.0 | 26 |
| 90° C. | 0.0 | 30 | 0.0 | 32 | 2.0 | 30 | 0.0 | 37 | 1.0 | 33 |
| 95° C. | −1.0 | 36 | −1.0 | 40 | 0.0 | 35 | 0.0 | 43 | 1.0 | 39 |
| 100° C. | −2.0 | 44 | −2.0 | 47 | 0.0 | 42 | −1.0 | 51 | 2.0 | 46 |
| 105° C. | −3.0 | 52 | −2.0 | 55 | 0.0 | 50 | −1.0 | 57 | 2.0 | 52 |
| 110° C. | −3.5 | 59 | −2.0 | 62 | 0.0 | 57 | −1.0 | 62 | 3.0 | 68 |

-continued

| | Core | | Skin | | | | | |
|---|---|---|---|---|---|---|---|---|
| | 71% Adsyl 6C30F + 9% CPS 606 + 20% DP8310M | | 50% Topas COC 8007F-400 + 50% Topas COC 9506F-04 | | | | | |
| Tensile Properties | MD | TD | MD | TD | MD | TD | MD | TD |
| Strength (Kpsi) | 3.9 | 25.4 | 4.1 | 24.7 | 4.1 | 22.5 | 4.3 | 30.5 |
| % Elongation | 245 | 74 | 288 | 58 | 275 | 57 | 263 | 65 |
| Modulus (Kpsi) | 163 | 279 | 168 | 295 | 151 | 256 | 169 | 289 |

Additional testing (Low load elongation at room temperature and 125° F.) conducted with the films samples is shown below:

| | Core | | Skin | | |
|---|---|---|---|---|---|
| | 71% Adsyl 6C30F + 9% CPS 606 + 20% DP8310M | | 50% Topas COC 8007F-400 + 50% Topas COC 9506F-04 | | |
| EXAMPLE 2 TDO Temp (° C.) | SAMPLE 1 112 | SAMPLE 2 110 | SAMPLE 3 108 | SAMPLE 4 106 | SAMPLE 5 104 |
| Thickness Gauge (Microns) | 195 (49.53) | 189 (48.01) | 188 (47.75) | 194 (49.28) | 204 (51.82) |
| % MD-LLE-RT | | | | | |
| 0.25 lbs. | 0.05 | 0.05 | 0.05 | 0.04 | 0.04 |
| 0.50 | 0.12 | 0.11 | 0.11 | 0.12 | 0.09 |
| 0.75 | 0.18 | 0.18 | 0.18 | 0.19 | 0.15 |
| 1.00 | 0.26 | 0.26 | 0.25 | 0.26 | 0.21 |
| 1.25 | 0.34 | 0.34 | 0.33 | 0.34 | 0.27 |
| 1.50 | 0.42 | 0.41 | 0.39 | 0.42 | 0.34 |
| 1.75 | 0.50 | 0.49 | 0.47 | 0.50 | 0.41 |
| 2.00 | 0.59 | 0.59 | 0.55 | 0.60 | 0.49 |
| % MD-LLE-125° F. | | | | | |
| 0.25 lbs. | 0.07 | 0.07 | 0.07 | 0.07 | 0.06 |
| 0.50 | 0.19 | 0.18 | 0.17 | 0.17 | 0.15 |
| 0.75 | 0.30 | 0.29 | 0.27 | 0.28 | 0.24 |
| 1.00 | 0.42 | 0.41 | 0.39 | 0.40 | 0.33 |
| 1.25 | 0.56 | 0.53 | 0.50 | 0.52 | 0.44 |
| 1.50 | 0.70 | 0.66 | 0.62 | 0.65 | 0.54 |
| 1.75 | 0.85 | 0.79 | 0.75 | 0.77 | 0.66 |
| 2.00 | 1.03 | 0.95 | 0.90 | 0.94 | 0.79 |

Observations

TDO Temperature: Continuity of operation was achieved over a temperature range of 112° C. down to 104° C. This large processing window, e.g., down to at least 104° C. with excellent continuity of operation, was a result of blending the Topas COC 8007 resin (Tg 78° C.) with Topas COC 9506(Tg 65° C.) at a 50/50 wt. ratio in the skin layer, in combination with a core layer including a terpolymer (Adsyl 6C30F) and 20% Polybutene-1 (DP8310M). The inclusion of hard resin was not required to maintain good continuity down to 104° C.

Optics: The reduction in TDO temperature had a significant positive effect on optics, particularly haze, as shown in the graphs below. A glass clear 2% haze is achievable with this formulation as well as good gloss (~90 units) and excellent clarity (~70%).

Density: The relatively low density of 0.91 to 0.92 g/cm$^3$ achieves the floatability requirement in preferred applications and results in an excellent yield (at ~195 gauge (49.5 microns)) of ~22.1 m$^2$/kg (15,800 in$^2$/lb).

Treatment: Corona treatment was applied to one side of the structure, which yielded a very strong 50-57 dynes/cm.

Natural Shrinkage: Measured after 24 hours at 40° C. was relatively consistent across the TDO temperature range that was employed. Providing low natural shrink minimizes distortion of the film as it is exposed to the stresses and temperatures normally associated with the printing process. Low distortion leads to better print quality.

MD-LLE: The % MD low load elongation (LLE) at room temperature (RT) was similar for each film sample, very good, and independent of TDO processing temperature. The % MD-LLE at 125° F. increased as expected but was still very good in the range of 0.23 to 0.45 kg load (0.5 to 1.0 lbs. load); less than 0.5%. Providing MD low load elongation minimizes distortion of the film as it is exposed to the stresses and temperatures normally associated with the printing process. Low distortion leads to better print quality.

Example 3

50% Skin Thickness Reduction

The use of one or more COC resins is extremely important; assisting in providing product stiffness and permitting solvent seaming. However, the COC resins are also the most expensive raw material in the film structure. Therefore, it is desirable to minimize the thickness of the COC skin layer(s), provided adequate stiffness and solvent seaming capability can be maintained. Minimizing skin thickness improves economics by lowering raw material costs.

This Example is the same as Sample 3 in Example 2, but with the thickness of each skin layer reduced to 17.5 gauge (4.45 microns). To provide a total film thickness similar to that of Sample 3 in Example 2, the core layer of Example 3 was increased to compensate for the reduction in thickness of the skin layers. A comparison of Sample 3 of Example 2 and this Example 3 is set forth below:

| | Core | Skin |
|---|---|---|
| | 71% Adsyl 6C30F + 9% CPS 606 + 20% DP8310M | 50% Topas COC 8007F-400 + 50% Topas COC 9506F-04 |
| Comparison | Example 2 - Sample 3 (35 gauge (8.89 microns) skin thickness) | Example 3 17.5 gauge (4.45 microns) skin thickness) |
| TDO Temp (° C.) | 108 | 108 |
| Thickness Gauge (Microns) | 188 (47.75) | 200 (50.8) |
| Yield (in²/lb.) | 16,000 | 15,200 |
| Density (g/cm³) | 0.92 | 0.91 |
| % Haze | 3.2 | 2.3 |
| % Clarity | 60 | 67 |
| 45° Gloss In | 83 | 89 |
| 45° Gloss Out | 83 | 89 |
| Treatment Dynes/cm (I/O) | 31/55 | 31/57 |
| % Shrinkage 24 hrs. @ 40° C. | MD  TD | MD  TD |
| | 0.0  1.5 | 0.3  1.3 |
| % Shrinkage 10 sec in oil | MD  TD | MD  TD |
| 80° C. | 1.0  18 | 2.0  17 |
| 85° C. | 1.0  24 | 1.0  23 |
| 90° C. | 2.0  30 | 1.0  30 |
| 95° C. | 0.0  35 | 1.0  36 |
| 100° C. | 0.0  42 | 0.0  44 |
| 105° C. | 0.0  50 | 0.0  51 |
| 110° C. | 0.0  57 | 0.0  58 |
| Tensile Properties | MD  TD | MD  TD |
| Strength (Kpsi) | 4.1  24.7 | 3.9  23.4 |
| % Elongation | 288  58 | 393  76 |
| Modulus (Kpsi) | 168  295 | 126  212 |

The comparison of this Example 3 (50% skin thickness reduction with a corresponding increase in core thickness) with Sample 3 of Example 2 ("full thickness), both produced at 108° C. TDO temperature, indicates the following:

Some improvement in optical properties, e.g., haze and clarity, with reduced skin thickness Comparable Natural shrinkage performance and TD shrink as a function of shrink temperature, both independent of skin thickness.

Some increase in tensile elongation and reduction in film modulus by reducing skin thickness in both the MD and TD directions, consistent with the lower level of rigid COC in the structure.

Example 4

Three film structures were made; each including opposed skin layers employing a 50/50 blend of Topas 8007F-600 and 9506F-500 modified COC resins. The core layers of each of the three films were varied by varying the percentage of the polybutene-1/ethylene copolymer (PB-1 copolymer) therein. Each of the core layers included 10% hard resin (CPS-606). However as the weight percent of the polybutene-1 copolymer (Basell DP8310M) was varied a corresponding change in the weight percent of the terpolymer (Adsyl 6C30F) was made. Specifically the three samples included a core layer with 20, 25 and 30 wt. %, respectively, of the polybutene-1 copolymer, with the weight percentage of the terpolymer varying in each of the core layers from 70%, 65% and 60%, respectively. Each of the samples employed had an MDO/TDO ratio of 1.2×/7.4× and a TDO stretching temperature of 106° C. The overall film thickness target was 200 gauge (50.8 microns) with skin thickness targets of 35 gauge (8.9 microns) on each side.

In some cases the reported values are the average (A) of three values measured on the left, center and right, respectively, of the formed film.

| | Core | | Skin | |
|---|---|---|---|---|
| | Adsyl 6C30F + 10% CPS 606 + DP8310M | | 50% Topas COC 8007F-600 + 50% Topas COC 9506F-500 | |
| Example 4 | Sample 1 | Sample 2 | Sample 3 | |
| % PP/PB-1 in Core | 70/20 | 65/25 | 60/30 | |
| Thickness Gauge (Microns) | 214 (54.36) | 204 (51.82) | 213 (54.10) | |
| Yield (In²/lb.) A | 14,198 | 14,910 | 14,297 | |
| Density (g/cm³) A | 0.912 | 0.913 | 0.912 | |
| % Haze A | 2.4 | 1.7 | 2.9 | |
| 45° Gloss (I/O) A | 89/88 | 93/92 | 93/93 | |
| % Clarity A | 59 | 78 | 68 | |
| RT-COF (I/O) - (I = inside of mill roll and O = outside of mill roll) | Static/dynamic 0.50/0.49 | Static/dynamic 0.60/0.59 | Static/dynamic 0.53/0.50 | |
| % Natural Shrink (MD/TD) 24 hrs. @ 40° C. | 0/1.0 | 0.3/1.0 | 0/1.0 | |
| TD % Shrinkage@ (10 sec in oil) | | | | |
| 60° C. | −0.5 | −1.0 | −1.0 | |
| 70° C. | 4.0 | 3.0 | 0.0 | |
| 80° C. | 14.7 | 27.0 | 31.0 | |
| 90° C. | 39.0 | 43.0 | 48.0 | |
| 95° C. | 45.0 | 50.0 | 56.0 | |
| 100° C. | 51.7 | 56.7 | 60.7 | |
| 110° C. | 62.0 | 64.3 | 69.3 | |
| TD Shrink Tension gms/inch @ 95° C. | 620 | 545 | 550 | |
| Tensile Properties Strength (Kpsi) | | | | |
| MD | 3.9 | 3.7 | 3.3 | |
| TD | 23.0 | 20.8 | 17.0 | |
| % Elongation | | | | |
| MD | 232 | 220 | 301 | |
| TD | 67 | 52 | 54 | |
| Modulus (Kpsi) | | | | |
| MD | 154 | 148 | 136 | |
| TD | 235 | 235 | 200 | |

Observations—Example 4

There is an incremental improvement in shrink performance at elevated temperature with increasing Polybutene-1 copolymer concentration in the core layer.

Optical properties were excellent, independent of Polybutene-1 copolymer, with low haze (<2.5%), good gloss (93 units I/O) and clarity (up to 78%).

Density (0.91) and yield (14,700) were within a desirable range (floatability in water).
Strong treatment was achieved up to 56 dynes/cm on the COC skin via corona
Natural Shrinkage is acceptable at 40° C.

Example 5

Three additional film structures were made, which were identical to the above three structures of Example 4, but with the thickness of the skin layers being reduced by ½ and the thickness of the core layer increased to compensate for the reduction in thickness of the skin layers. In all other respects Samples 1, 2 and 3 of this Example 5 are identical to Samples 1, 2 and 3 of Example 4.

The properties of the Example 5 film samples are shown below. In some cases the reported values are the average (A) of three values measured on the left, center and right, respectively, of the formed film.

| Example 5 | Sample 1 | Sample 2 | Sample 3 |
|---|---|---|---|
| % PB-1 in Core | 20 | 25 | 30 |
| Thickness | 227 | 229 | 225 |
| Gauge (Microns) A | (57.66) | (58.17) | (57.15) |
| Yield (In²/lb.) A | 13,570 | 13,517 | 13,741 |
| Density (g/cm³) A | 0.899 | 0.898 | 0.896 |
| % Haze A | 2.1 | 1.8 | 1.8 |
| 45° Gloss (I/O) A | 90/90 | 92/92 | 92/92 |
| % Clarity A | 64 | 77 | 62 |
| RT-COF (I/O) | Static/dynamic 0.52/0.51 | Static/dynamic 0.59/0.58 | Static/dynamic 0.53/0.54 |
| Treatment Dynes/cm (I/O) | 31/56 | 30/56 | 30/55 |
| Gurley MD Stiffness | 8.6 | 7.9 | 8.0 |
| % Natural Shrink (MD/TD) 24 hrs. @ 40° C. | 0/1.5 | 0.3/1.3 | 0/1.0 |
| TD % Shrinkage (10 sec in oil) | | | |
| @ 60° C. | 0.0 | 0.0 | −1.0 |
| 70° C. | 7.0 | 6.0 | 4.0 |
| 80° C. | 19.0 | 20.0 | 23.0 |
| 90° C. | 30.0 | 33.0 | 37..0 |
| 95° C. | 36.0 | 39.0 | 44.0 |
| 100° C. | 42.7 | 48.3 | 52.0 |
| 110° C. | 54.7 | 59.7 | 63.0 |
| TD Shrink Tension gms/inch @ 95° C. | 597 | 532 | 486 |
| Tensile Properties Strength (Kpsi) | | | |
| MD | 3.8 | 3.4 | 3.3 |
| TD | 23.7 | 20.7 | 15.2 |
| % Elongation | | | |
| MD | 389 | 352 | 337 |
| TD | 80 | 57 | 54 |
| Modulus (Kpsi) | | | |
| MD | 117 | 116 | 100 |
| TD | 210 | 199 | 171 |

Observations—Example 5
A transverse shrinkage in excess of 50% was achieved when the shrink temperature was between 95-100° C. in Sample 3. In all cases the % TD shrinkage went down with a reduction in thickness of the COC skin layers.

Samples 2 and 3 of Example 5 exhibited a shrinkage of at least 20% in the 80-100° C. temperature range.

All three samples of Example 5 exhibited a shrinkage in excess of 35% at 95° C.

Skin thickness was determined to have an effect on the shrinkage properties of the film.

The relationship between % TD shrinkage and wt. % PB-1 in the Example 5 samples is linear from 20 to 30% PB-1 as it was with the Example 3 samples, albeit at lower levels. Shrink tension was lower for the Example 5 samples than the Example 4 samples.

Optical properties were excellent with low haze (<2.1%), good gloss (91-93 units I/O) and clarity (up to 77%).

Density (0.90) went down with a reduction of skin thickness as would be expected since the skin has a higher density than the core.

Strong treatment was achieved up to 56 dynes/cm on the COC skin via corona

Natural Shrinkage is reasonable at 40° C.

Tensile strength and modulus were slightly reduced in the Example 5 samples as compared to the Example 4 samples.

Example 6

Biaxially Oriented Films

Three samples of biaxially oriented films included the exact same formulations in the skin layers and core layers as the three samples in Example 4. However, the three samples of Example 6 were biaxially oriented to include 4.3×/7.4× MDO/TDO; as opposed to the uniaxial orientation of the Example 4 samples. In all other respects the three films of Example 6 were the same as the three samples of Example 4.

The properties of the Example 6 samples are reported below. In some cases the reported values are the average (A) of three values measured on the left, center and right, respectively, of the formed film.

| Example 6 | Sample 1 | Sample 2 | Sample 3 |
|---|---|---|---|
| % PB-1 in Core | 20 | 25 | 30 |
| Thickness | 244 | 243 | 246 |
| Gauge (Microns) A | (61.98) | (61.72) | (62.48) |
| Yield (In²/lb.) A | 12,677 | 11,962 | 12,587 |
| Density (g/cm³) A | 0.90 | 0.90 | 0.90 |
| % Haze A | 5.1 | 5.0 | 3.9 |
| 45° Gloss (I/O) A | 78/79 | 77/77 | 83/83 |
| % Clarity A | 69 | 67 | 64 |
| RT-COF (I/O) | Static/dynamic 0.46/0.50 | Static/dynamic 0.47/0.48 | Static/dynamic 0.47/0.46 |
| Treatment Dynes/cm (I/O) | 32/40 | 31/56 | 31/58 |
| Gurley MD Stiffness | 13.8 | 14.6 | 10.9 |
| % Natural Shrink (MD/TD) 24 hrs. @ 40° C. | 0.8/2.3 | 0.8/2.3 | 0.8/2.3 |
| MD % Shrinkage (10 sec in oil) | | | |
| @ 60° C. | −1.0 | 0.0 | 0.0 |
| 70° C. | 2.0 | 8.0 | 7.0 |
| 80° C. | 8.0 | 8.0 | 10.0 |
| 90° C. | 13.0 | 13.0 | 13.5 |
| 95° C. | 17.0 | 17.0 | 17.0 |

-continued

| Example 6 | Sample 1 | Sample 2 | Sample 3 |
|---|---|---|---|
| 100° C. | 21.0 | 24.0 | 23.0 |
| 110° C. | 36.0 | 38.0 | 38.0 |
| TD % Shrinkage (10 sec in oil) | | | |
| @ 60° C. | 0.0 | 0.0 | 0.0 |
| 70° C. | 7.0 | 8.0 | 7.0 |
| 80° C. | 17.0 | 23.0 | 23.7 |
| 90° C. | 28.0 | 37.0 | 37.0 |
| 95° C. | 35.0 | 44.0 | 44.0 |
| 100° C. | 42.3 | 49.7 | 51.0 |
| 110° C. | 56.0 | 59.7 | 60.0 |
| TD Shrink Tension gms/inch @ 95° C. | 440 | 545 | 501 |
| Tensile Properties Strength (Kpsi) | | | |
| MD | 13.7 | 11.1 | 13.1 |
| TD | 22.6 | 19.1 | 23.7 |
| % Elongation | | | |
| MD | 157 | 150 | 133 |
| TD | 97 | 88 | 84 |
| Modulus (Kpsi) | | | |
| MD | 115 | 104 | 122 |
| TD | 226 | 192 | 219 |

Observations—Example 6 Samples

Increasing the MDO draw ratio from 1.2× to 4.3× increases the % shrinkage significantly compared to the 1.2× films yielding a 17% MD shrinkage at 95° C. and rising to ~38% at 110° C. There was essentially no impact of the % PB-1 in the core on MD shrinkage.

Over 50% shrinkage in the TD was achieved at between 95-100° C. in sample 3, which included 30% PB-1 copolymer in the core layer; similar to the oriented sample 3 film of Example 4.

The % TD shrinkage trends upward with increasing PB-1 in the core but appeared to plateau between 25-30% PB-1.

Haze increased versus the oriented films of Example 4 to ~5% and gloss reduced to approximately 83 units due to slightly rougher COC skin surfaces. Clarity remained good up to 76%.

Treatment was excellent reaching a high of 58 dynes/cm.

MD Gurley stiffness was higher than the uniaxially oriented samples of Example 4 and most likely was influenced by the increase in thickness of the films.

MD and TD strength were not a function of the level of PB-1 however the MD strength was increased substantially due to increased orientation as compared to the orientation of the Example 4 samples.

Example 7

The following sample in accordance with this invention was targeted for production on one of applicant's production lines: Film was produced at a stretch ratio of 1.2×MD and 7.48×TD, an oven temperature of 100° C., and a film thickness target of 190 gauge (48.3 microns).

| | Film Composition | Wt. % | Target Gauge (Microns) |
|---|---|---|---|
| | NON TREATED | | |
| Skin | Topas 8007F-600 | 50.0% | 34.0 |
| layer A | Topas 9506F-500 | 50.0% | (8.6) |
| Core | 6C30F | 66.0% | 122 |
| layer B | CPS606 | 9.0% | (31.0) |
| | DP8310M | 25.0% | |
| Skin | Topas 8007F-600 | 50.0% | 34.0 |
| Layer C | Topas 9506F-500 | 50.0% | (8.6) |
| | CORONA TREATED | | |

Film samples were evaluated and results are given as follows:

| Example 7 | Sample |
|---|---|
| Core Main Comp. | Adsyl 6C30F |
| Core Wt % PP/HR/PB-1 | 66/9/25 |
| Thickness - Gauge (Microns) | 197 (50.0) |
| Yield (In²/lb.) | 14,911 |
| Density (g/cm³) | 0.944 |
| % Haze | 4.6 |
| 45° Gloss (I/O) | 80/81 |
| % Clarity | 54 |
| RT-Coefficient of Friction (I/O) | Static/dynamic 0.58/0.58 |
| I/SS | 0.23/0.20 |
| O/SS | 0.35/0.26 |
| Treatment Dynes/cm (I/O) | 30/≥68 |
| Gurley Stiffness MD | 10.44 |
| % Natural Shrink (MD/TD) 24 hrs. @ 40° C. | 0.0/0.5 |
| TD % Shrinkage 10 Sec in Oil | |
| @ 60° C. | 0.0 |
| 70° C. | 0.0 |
| 80° C. | 6.0 |
| 90° C. | 46.0 |
| 95° C. | 53.0 |
| 100° C. | 60.0 |
| 110° C. | 69.3 |
| TD Shrink Tension gms/inch @ 95° C. | 666 |
| Tensile Properties Strength (Kpsi) | |
| MD | 4.3 |
| TD | 27.4 |
| % Elongation | |
| MD | 590 |
| TD | 27 |
| Modulus (Kpsi) | |
| MD | 153 |
| TD | 347 |

Observations: Continuity of film forming without breaks was achieved for a period exceeding 8 hours before shutting down the line at the end of the trial. This permitted an optimization of line operations providing production of a shrink film having a haze value less than 5% (4.6) and a 95° C. shrink greater than 50% (53%).

Example 8

Various samples were made to investigate the use of alternative polymers for the Adsyl 7410-XCP or Adsyl 6C30F terpolymer constituting the major component, by weight, in the core layer. The alternative polymers investigated were Total EOD 02-15 metallocene based ethylene copolymer, and Nova FPs317A LLDPE. These alternative polymers, in addition to the Adsyl 7410-XCP terpolymer were maintained at 60 wt. % of the core layer in all samples in which they were used. The Adsyl 6C30F terpolymer was maintained at 60 wt. % in all samples in which it was used except for two; namely, Sample 2 included 70 wt. % of the terpolymer and no hard resin, and Sample 5 included 50 wt. % of the terpolymer to accommodate the increase to 40 wt. % of the PB-1 copolymer. (see the below chart).

Samples were made to determine the significance/criticality of utilizing a hard resin in the core and to investigate the use of higher levels of the PB-1 copolymer in the core layer to obtain improved shrink performance. In all samples the thickness of the core layer was maintained at 110 gauge (27.9 microns).

In all of the samples the skin layers consisted of a 50/50 blend of Topas 8007F-600 and 9506F-500 modified COC resins, by weight, at 35 gauge (8.9 microns) on each side.

increased to 40 wt. %. In that sample the weight percent of the propylene terpolymer (Adsyl 6C30F) was decreased to 50 wt. %. The Hard Resin, HR, CPS606, was maintained constant at 10 wt. %, except in Sample 2, which was run without the hard resin.

In all samples the MDO was held constant at ~1.2× and the TDO was held constant at ~6.8× with the temperature profile varied according to the response of the core formulation changes(sample 1 TDO temperature 105° C.; sample 2-5 TDO temperature 104° C., and sample 6 TDO temperature 106° C.).

In each sample both skin layers were corona treated.

The results/formulations of the Example 8 samples are given as follows:

| EXAMPLE 8 | Sample 1 | Sample 2 | Sample 3 | Sample 4 | Sample 5 | Sample 6 |
|---|---|---|---|---|---|---|
| Core Main Comp. | Adsyl 6C30F | Adsyl 6C30F | Adsyl 7410 | Total EOD-02-15 | Adsyl 6C30F | Nova FPs317A |
| Core Wt. % PP/HR/PB-1 | 60/10/30 | 70/0/30 | 60/10/30 | 60/10/30 | 50/10/40 | 60/10/30 |
| Thickness - Gauge (Microns) | 199 (50.6) | 182 (46.2) | 185 (47.0) | 209 (53.1) | 178 (45.2) | 177 (45.0) |
| Yield (In$^2$/lb.) | 14,457 | 15,732 | 15,919 | 14,458 | 16,844 | 15,441 |
| Density (g/cm$^3$) | 0.944 | 0.945 | 0.949 | 0.951 | 0.940 | 0.965 |
| % Haze | 2.3 | 1.7 | 1.5 | 1.8 | 1.8 | 3.7 |
| 45° Gloss (I/O) | 90/89 | 93/93 | 93/93 | 91/91 | 92/92 | 85/85 |
| % Clarity | 63 | 72 | 68 | 69 | 70 | 21 |
| RT-COF (I/O) | Static/dynamic 0.65/0.62 | Static/dynamic 0.66/0.62 | Static/dynamic 0.68/0.66 | Static/dynamic 0.75/0.71 | Static/dynamic 0.68/0.66 | Static/dynamic 0.64/0.61 |
| Treatment Dynes/cm (I/O) | 59/56 | 58/57 | 60/56 | 61/57 | 59/57 | 59/57 |
| Gurley MD Stiffness | 11.6 | 9.0 | 9.8 | 11.9 | 7.8 | 9.2 |
| TD % Shrinkage 10 Sec in Oil | | | | | | |
| @ 70° C. | 0.0 | 0.7 | 0.0 | 1.7 | 0.0 | 5.3 |
| 80° C. | 26.7 | 27.0 | 31.3 | 29.0 | 32.0 | 30.0 |
| 90° C. | 44.7 | 44.0 | 53.0 | 44.3 | 56.3 | 47.3 |
| 95° C. | 50.0 | 51.0 | 57.7 | 47.0 | 61.0 | 51.0 |
| 100° C. | 57.0 | 58.0 | 62.7 | 53.0 | 66.0 | 58.0 |
| 110° C. | 67.0 | 66.7 | 68.7 | 61.7 | 71.3 | 72.3 |
| TD Shrink Tension gms/inch @ 95° C. | 467 | 422 | 429 | 567 | 380 | 647 |
| Tensile Properties Strength (Kpsi) | | | | | | |
| MD | 4.0 | 3.3 | 3.5 | 3.8 | 3.4 | 3.1 |
| TD | 20.6 | 17.3 | 18.2 | 21.0 | 17.6 | 14.3 |
| % Elongation | | | | | | |
| MD | 447 | 496 | 605 | 734 | 443 | 619 |
| TD | 58 | 42 | 41 | 49 | 39 | 51 |
| Modulus (Kpsi) | | | | | | |
| MD | 154 | 130 | 127 | 126 | 126 | 116 |
| TD | 240 | 222 | 229 | 232 | 222 | 163 |

The 10% hard resin concentrate, CPS-606, was kept constant in all samples, except in one sample in which it was removed completely. In that sample the amount of the propylene terpolymer (Adsyl 6C30F) was increased to 70 wt. %.

The PB-1 copolymer, Basell DP8310M, was maintained constant at 30 wt. %, except in Sample 5, in which it was Observations:

A comparison of the Sample 1 and 2 film structures of Example 8 shows that the presence of hard resin in the core structure is not an essential requirement for delivering high shrinkage with acceptable haze. Some benefit is seen with respect to modulus and tensile strength. In accordance with the broadest aspects of this invention a hard resin component is not required to be included in the core layer. However, in more limited embodiments of the invention the addition of a hard resin does provide product benefits.

The use of Adsyl 7410 XCP terpolymer in place of Adsyl 6C30F at the same concentration in the core (all other components being equal) provides incremental improvements in shrink performance at elevated temperatures.

Increasing the level of Polybutene-1 copolymer in the core (to 40% in Sample 5 of Example 8) incrementally improves shrink performance at elevated temperatures.

Alternative polyolefin polymers (instead of propylene terpolymers) also provide an acceptable balance of properties when used in combination with Polybutene-1 copolymer. This is illustrated with the film structures of Sample 4 (propylene/ethylene metallocene copolymer) and Sample 6 (LLDPE). While not preferred, both of these latter samples are film structures with haze values and shrink performance which meet performance levels within the scope of this invention. The clarity of Sample 6 was however poor vs the use of the other polymers identified in Samples 1-5 of Example 8.

Example 9 and Example 10

Additional pilot line studies were carried out to evaluate the following: 1) the effect of employing a higher level of polybutene-1 copolymer (40% in the core), 2) the influence of varying the ratio of the two COC's used in the skin layers, 3) a comparison of Adsyl 6C30F vs Adsyl 7410 terpolymer with different COC skin ratios, and 4) the effect of incorporation of TD shrink reclaim in the core.

In these studies the MDO was held constant at ~1.2× and the TDO at ~6.8× with the temperature profile held constant at 104 C in the three separate oven zones. Total film thickness of 180 gauge (45.7 microns) was targeted with symmetrical skin thickness of 35 gauge (8.9 microns).

The five samples identified in EXAMPLE 9 in the table below compare film structures with varying COC skin blend ratios (Topas 9506F-500 and Topas 8007F-600) and the two terpolymers employed in the core. In all formulations of the five samples the Polybutene-1 copolymer (Koattro DP8310M) level in the core was fixed at 40 wt. %. The average total thickness in all five samples was very close to the targeted level.

The properties determined for the five identified samples are reported in the following table.

| Example 9 | Sample-1 | Sample-2 | Sample-3 | Sample-4 | Sample-5 |
|---|---|---|---|---|---|
| Core Composition PP + PB-1 | Adsyl 6C30F + Koattro DP8310M | | | Adsyl 7410 + Koattro DP8310M | |
| Core Wt. % PP/PB-1 | | | 60/40 | | |
| Skin Composition (COC) 8007F-600/9506F-500 | 50/50 | 40/60 | 30/70 | 30/70 | 50/50 |
| Thickness (Gauge) | 173 | 176 | 176 | 174 | 178 |
| Yield (in²/lb.) | 17,400 | 17,100 | 17,100 | 17,400 | 16,900 |
| Density (g/cm³) | 0.923 | 0.921 | 0.920 | 0.915 | 0.923 |
| % Haze | 3.1 | 1.8 | 1.9 | 1.7 | 2.9 |
| 45° Gloss (I/O) | 87/87 | 93/93 | 92/92 | 92/93 | 88/88 |
| % Clarity | 67 | 75 | 72 | 70 | 66 |
| Flex Stiffness MD (g/in.) | 2.0 | 2.2 | 2.3 | 2.2 | 2.2 |
| Z-axis Strength (g/in) | 39 | 33 | 27 | 36 | 28 |
| Natural Shrink (MD/TD) 24 hrs. @ 50° C. | 0/2.5 | −0.3/2.0 | 0/2.8 | 0/2.5 | 0/2.5 |
| TD % Shrinkage 10 Sec in Oil | | | | | |
| @ 70° C. | 2 | 2 | 3 | 2 | 2 |
| 80° C. | 39 | 35 | 32 | 35 | 29 |
| 90° C. | 56 | 57 | 49 | 54 | 55 |
| 95° C. | 62 | 63 | 56 | 60 | 62 |
| 100° C. | 67 | 66 | 62 | 66 | |
| Tensile Properties Strength (Kpsi) | | | | | |
| MD | 3.0 | 3.0 | 3.4 | 3.1 | 3.3 |
| TD | 16.4 | 17.5 | 20.4 | 18.5 | 17.2 |
| % Elongation | | | | | |
| MD | 650 | 522 | 305 | 335 | 175 |
| TD | 28 | 36 | 51 | 45 | 26 |
| Modulus (Kpsi) | | | | | |
| MD | 109 | 117 | 120 | 120 | 134 |
| TD | 205 | 208 | 219 | 207 | 228 |

Observations:

Property trends with a change in the ratio of Topas COC 9506F-500 and 8007F-600 appeared to be consistent but modest. As the percent Topas 9506F-500 in the skin was increased from 50 wt. % to 60 wt. % and then 70 wt. %, TD shrink consistently was reduced. This was contrary to what was expected as the glass transition temperature of 9506F-500 is lower than that of 8007F-600. Expectations were that with a lower "blended" Tg, shrink initiation temperature would occur at lower temperatures and would be reflected in greater % shrink in the temperature range of interest (80-100° C.). Gloss, TD tensile strength, and TD elongation also exhibited increases with increasing amounts of 9506F-500.

Six (6) additional samples identified in EXAMPLE 10 were tested to evaluate the influence of high levels of TD shrink film reclaim on properties and processability of the film. In the manufacture of these samples the MDO was held constant at ~1.2× and the TDO at ~6.8× with the temperature profile held constant at 104° C. in all zones of the oven as well as the feed ratio Adsyl 6C30F Terpolymer: Koattro DP8310M Polybutene-1=60/40. Total film thickness of 180 gauge (45.7 microns) was targeted with symmetrical skin thickness of 35 gauge (8.8 microns). Actual total thickness of all six samples was close to the targeted thickness.

The reclaim employed in this example was obtained from the Example 7 trials identified above.

The below table shows the properties achieved with reclaim levels being varied from 0-40% replacing the main core components accordingly:

Moreover, the positive effects on tensile and z-axis properties are desirable. And these benefits can be achieved in a clear film structure.

Example 11 and Example 12

In addition, the effect of including additional additives/compositions in the core of various structures was investigated, including the addition of shrink film reclaim, propylene elastomeric copolymers (with ethylene), and Styrenic triblock (S-E/B-S) copolymer elastomers, alone or in combination. Incorporating these additional components into the film core provide several beneficial improvements described hereinafter. Film structures employing these additional additives are generally described by the following:

| Example 10 | Sample 1 | Sample 2 | Sample 3 | Sample 4 | Sample 5 | Sample 6 |
|---|---|---|---|---|---|---|
| Core Main Comp. PP + PB-1 | Adsyl 6C30F Terpolymer + Koattro DP8310M Polybutene-1 | | | | | |
| Skin Composition | 40% Topas 8007F-600 + 60% Topas 9506F-500 | | | | | |
| Core Wt. % PP/PB-1 | 60/40 | 54/36 | 48/32 | 42/28 | 39/26 | 36/24 |
| Reclaim Level | 0% | 10% | 20% | 30% | 35% | 40% |
| Thickness (Gauge) | 176 | 168 | 172 | 173 | 170 | 164 |
| Yield (in²/lb.) | 17,100 | 17,900 | 17,300 | 17,300 | 17,400 | 18,200 |
| Density (g/cm³) | 0.921 | 0.922 | 0.925 | 0.927 | 0.934 | 0.931 |
| % Haze | 1.8 | 2.3 | 2.9 | 4.2 | 3.6 | 3.5 |
| 45°Gloss (I/O) | 93/93 | 93/93 | 92/93 | 86/87 | 91/92 | 93/93 |
| % Clarity | 75 | 72 | 70 | 59 | 70 | 72 |
| Flex Stiffness MD (g/in.) | 2.2 | 2.1 | 2.5 | 2.5 | 2.1 | 2.1 |
| Z-axis Strength (g/in) | 33 | 45 | 69 | 93 | 63 | 88 |
| Natural Shrink (MD/TD) 24hrs. @ 50° C. | −0.3/2.0 | 0/2.5 | 0/2.5 | 0/1.8 | 0/2.0 | 0/1.8 |
| TD % Shrinkage 10 Sec in Oil | | | | | | |
| @ 70° C. | 2 | 2 | 2 | 2 | 2 | 2 |
| 80° C. | 35 | 34 | 33 | 33 | 34 | 34 |
| 90° C. | 57 | 55 | 54 | 55 | 56 | 56 |
| 95° C. | 63 | 61 | 60 | 62 | 61 | 62 |
| 100° C. | 66 | 65 | 65 | 64 | 66 | 66 |
| Tensile Properties Strength (Kpsi) | | | | | | |
| MD | 3.0 | 3.3 | 3.5 | 4.2 | 4.2 | 4.3 |
| TD | 17.5 | 17.0 | 18.3 | 17.8 | 19.4 | 19.9 |
| % Elongation | | | | | | |
| MD | 522 | 349 | 584 | 261 | 286 | 268 |
| TD | 36 | 32 | 38 | 37 | 36 | 40 |
| Modulus (Kpsi) | | | | | | |
| MD | 117 | 119 | 127 | 158 | 156 | 154 |
| TD | 208 | 214 | 223 | 245 | 252 | 245 |

Observations:

Tensile modulus (MD and TD) and tensile strength (MD and TD) both increased modestly with increased reclaim content. In addition, Z axis strength also appears to benefit from the incorporation of reclaim. Interestingly it was determined that a significant level of reclaim can be included in the core structure without an unacceptable impact on optical properties (clarity is little changed up to 40 wt. % reclaim and haze remains below 5%). Gloss is also not significantly affected by incorporating reclaim in the core. Also, density increased modestly with increased reclaim level as expected do to the presence of COC in the reclaim resin.

The ability to incorporate up to 30-40 wt. % reclaim in the core is highly beneficial for manufacturing economics.

Corona Treated

| | |
|---|---|
| 6.5-8.5 μm | 30-50% Topas COC 8007F-600 |
| | 70-50% Topas COC 9506F-500 |
| 30-33 μm | 30-80% LYB Adsyl 6C30F or 7410XCP Terpolymer |
| | 10-40% LYB Koattro DP8310M Polybutene-1 copolymer |
| | 0-25% Vistamaxx 3980FL or Versify 3000 or Kraton G 1645 |
| | 0-40% Reclaim |
| 6.5-8.5 μm | 30-50% Topas COC 8007F-600 |
| | 70-50% Topas COC 9506F-500 |

Corona Treated (Optional) Polymer

A number of the above-identified polymers have been described in connection with the earlier discussed Examples. Additional polymers/additives not described earlier are as follows:

Vistamaxx and Versify Copolymers—Propylene-based elastomeric copolymers (POE's) are commercially available from ExxonMobil Chemical Company under the trade name Vistamaxx or Dow Chemical Company under the trade name Versify. These are semi crystalline copolymers of propylene and ethylene with high propylene levels (>80 wt. %) with isotactic stereochemistry. Crystallinity is modulated with ethylene: 5-25% crystallinity, large amorphous fraction. These POE's have a narrow Molecular Weight Distribution (MWD), Melt Flow Rate (MFR): 2 to 25 g/10 min, Density: 0.863 to 0.891 g/cm$^3$, Glass Transition Temperature: −15 to −35° C. (5 to −31° F.)), Melting Range: 50 to 120° C. (122 to 248° F.) and higher. Vistamaxx 3980F has a melt flow rate (190/2.16) of 3.2 dg/min, an ethylene content of 9%, a density of 0.879 g/cm$^3$, and a Vicat softening point of 76.7° C. Versify 3000 has a melt flow rate (230/2.16) of 8 dg/min, a density of 0.88 g/cm$^3$, a melting point of 108° C., a crystallinity of 44%, and a Vicat softening point of 52° C.

Kraton G Block Copolymer (S-E/B-S)—Kraton G 1645 is a styrene—ethylene-co-butene-Styrene triblock elastomer with 12.5% styrene content, a melt flow rate (23/2.16) of 3.3 dg/min, and an ethylene-co-butene block Tg of −42° C.

Four (4) additional samples were made for the purpose of evaluating the effect of adding propylene copolymer (with ethylene) elastomer to the core formulation containing propylene terpolymer, polybutene-1 copolymer, and TD shrink film reclaim as the main components therein. The primary purpose of this trial was to examine the influence on Z-axis strength, optics and shrink performance of adding propylene based elastomers in the core. It was anticipated that the presence of the elastomer would help to compatabilize the COC component of reclaim in the core. In addition, these samples employed varying COC skin thicknesses to investigate the acceptability of reducing skin thickness to provide better economics without a significant penalty to shrink performance, e.g., by reducing material cost and running at higher line rates.

In the formation of these four (4) additional samples the MDO was held constant at 1.2× and the TDO at ~6.8× with the temperature profile held constant at 104° C. in all of the oven zones. Total film thickness of 180 gauge (45.7 microns) was targeted with symmetrical skin thickness of 26 gauge (6.6 micron, 25% reduction from previously discussed samples). Actual average total thickness was slightly less than target.

The reclaim employed in this example was obtained from the Example 7 trials identified above. The results are given as follows:

| Example 11 | Sample 1 | Sample 2 | Sample 3 | Sample 4 |
|---|---|---|---|---|
| Core Main Comp. | Adsyl 6C30F Terpolymer + Koattro DP8310M | | | |
| PPC + CPB-1 | Polybutene-1 Optionally with Versify 3000 or | | | |
| Other core comp. | Vistamaxx 3980FL Copolymer (i.e., Elastomers) | | | |
| Skin Composition | 50% Topas 8007F-600 + 50% Topas 9506F-500 | | | |
| Core Wt. % PP/PB-1 | 45/30 | 42/28 | 45/30 | 42/28 |
| Core Wt. % Vistamaxx/Versify | 0/5 | 0/10 | 5/0 | 10/0 |
| Reclaim Level | 20% | 20% | 20% | 20% |
| Thickness (Gauge) | 168 | 176 | 170 | 168 |
| Yield (in$^2$/lb.) | 17,734 | 16,820 | 17,592 | 17,900 |
| Density (g/cm$^3$) | 0.930 | 0.935 | 0.925 | 0.924 |
| % Haze | 3.1 | 3.3 | 3.5 | 3.5 |
| 45° Gloss (I/O) | 91/91 | 90/91 | 90/90 | 89/90 |
| % Clarity | 70 | 71 | 71 | 71 |
| Flex Stiffness (g/in.) MD | 1.91 | 2.46 | 1.99 | 2.23 |
| Z-axis Strength (g/in) | 169 | 154 | 146 | 155 |
| TD % Shrinkage 10 Sec in Oil | | | | |
| 85° C. | 40 | 37 | 42 | 43 |
| 90° C. | 48 | 44 | 49 | 50 |
| 95° C. | 54 | 52 | 57 | 58 |
| 100° C. | 62 | 58 | 63 | 64 |
| 105° C. | 69 | 64 | 68 | 69 |
| Tensile Properties Strength (Kpsi) | | | | |
| MD | 3.8 | 4.0 | 3.7 | 3.9 |
| TD | 15.9 | 17.5 | 17.8 | 18.4 |
| % Elongation | | | | |
| MD | 260 | 294 | 285 | 263 |
| TD | 42 | 47 | 42 | 44 |
| Modulus (Kpsi) | | | | |
| MD | 137 | 130 | 124 | 117 |
| TD | 208 | 205 | 206 | 210 |

Observations:

Incorporating low levels of propylene based elastomer (Versify or Vistamaxx) was highly beneficial for Z-axis strength (interlayer adhesion) while maintaining good optics (haze and clarity) and excellent processability on line. Reducing skin thickness by 25% had a relatively modest effect on shrink performance at the target temperature of 95° C.—reducing shrinks percentages from the low 60's to the mid to upper 50's, which still is above the desired threshold level of 50% for most applications.

The presence of reclaim and propylene elastomer reduced the required level of propylene terpolymer and butene-1copolymer in the core (both reduced in proportion to their concentration in the core).

An additional (5) samples were investigated to determine the influence, if any, of adding propylene elastomeric copolymer (with ethylene), alone or in combination with Styrenic triblock (S-E/B-S) copolymer elastomer to a core formulation containing propylene terpolymer, butene-1 copolymer, and TD shrink film reclaim as the main components.

In these samples the MDO was held constant at ~1.2× and the TDO at ~6.8× with the temperature profile held constant at 104 C in all oven zones. Total film thickness of 180 gauge (45 microns) was targeted with symmetrical skin thickness of 26 gauge (6.6 micron). Actual average total thickness was slightly less than target.

The reclaim employed in this example was obtained from the Example 7 trials identified above.

The results are as follows:

Observations:

Higher levels of propylene elastomer (Vistamaxx) together with a high level of reclaim in the core in combination with propylene terpolymer and polybutene-1 copolymer provided further improvements in Z-axis strength with excellent shrink performance (mid to upper 60's at 95° C.) and processability.

As an alternative, combinations of propylene based copolymer elastomer (Vistamaxx) and a Styrenic based block copolymer (Kraton G) together with propylene terpolymer, polybutene-1 copolymer, and reclaim were tested with very good results. In this comparison, an alternative terpolymer (Adsyl 7410XCP) was used in the core. Z axis strength was improved to an extent that exceeded the bond strength of the adhesive tape to film surface used in the Z-axis test.

A number of modifications and additions can be made to the films of this invention without departing from the scope of the invention as specified in the claims. For example the core and or skin(s} can include various additives that are well know for inclusion in polyolefin films; provided that such additives do not interfere with or adversely affect the required performance or properties of the shrink films of this invention. Conventional additives that may be useable in the core and/or skin layer(s) of the films of this invention include anti-blocking agents of roughly spherical shape that may be based on silica, cross-linked PMMA, crosslinked silicone of a diameter between 50% and 200% of the skin thickness (in one or both of the skins) and/or slip agents such as fatty acid amides selected from the group consisting of

| Example 12 | Sample-1 | Sample-2 | Sample-3 | Sample-4 | Sample-5 |
|---|---|---|---|---|---|
| Core Main Comp. PP + PB-1 | Adsyl 6C30F + Koattro DP8310M + Vistamaxx | | | Adsyl 7410 + Koattro DP8310M + Vistamaxx | |
| Other core comp. | 3980FL Copolymer | | | 3980FL + Optionally Kraton G1645 | |
| Skin Composition | 50% Topas 8007F-600 + 50% Topas 9506F-500 | | | | |
| Core Wt. % PP/PB-1 | 42/28 | 36/24 | 30/20 | 30/20 | 30/10 |
| Core Wt. % Vistamaxx/Kraton G | 10/0 | 20/0 | 25/0 | 25/0 | 25/10 |
| Reclaim Level | 20% | 20% | 25% | 25% | 25% |
| Thickness (Gauge) | 172 | 163 | 156 | 154 | 147 |
| Yield (in²/lb.) | 17,400 | 18,400 | 19,200 | 19,400 | 20,400 |
| Density (g/cm³) | 0.924 | 0.927 | 0.928 | 0.928 | 0.927 |
| % Haze | 4.1 | 4.1 | 4.5 | 4.2 | 4.6 |
| 45° Gloss (I/O) | 86/88 | 89/90 | 90/90 | 90/90 | 86/85 |
| % Clarity | 71 | 69 | 70 | 69 | 73 |
| Z-axis Strength (g/in) | 167 | 282 | 289 | Could not delaminate | Could not delaminate |
| TD % Shrinkage 10 Sec in Oil | | | | | |
| @ 85° C. | 45.0 | 49.0 | 48.0 | 52.0 | 50.0 |
| 90° C. | 52.0 | 60.0 | 59.0 | 60.0 | 60.0 |
| 95° C. | 61.0 | 66.0 | 66.0 | 67.0 | 67.0 |
| Tensile Properties Strength (Kpsi) | | | | | |
| MD | 3.7 | 3.4 | 3.4 | 3.4 | 3.6 |
| TD | 16.0 | 16.2 | 15.4 | 14.1 | 14.9 |
| % Elongation | | | | | |
| MD | 321 | 282 | 284 | 280 | 266 |
| TD | 43 | 42 | 37 | 37 | 39 |
| Modulus (Kpsi) | | | | | |
| MD | 101 | 95 | 91 | 93 | 84 |
| TD | 166 | 147 | 146 | 137 | 132 | stearamide, erucamide, behenamide and stearoyl ethyl erucamide, or anti-static agents such as glycerol mono stearate or ethoxylated alkyl amines.

Other changes/modifications may be made without departing from the scope of the invention as specified in the claims.

What is claimed is:

1. An oriented, multilayer shrink film comprising a core layer and at least one skin layer, said core layer having a thickness greater than a thickness of said at least one skin layer, said at least one skin layer comprising at least one cyclic-olefin copolymer as a predominant component thereof, said core layer comprising a blend of: (a) an olefin polymer which is a terpolymer; (b) an olefin-based elastomer; and (c) a butene-1 copolymer with ethylene, the butene-1 constituting over 75% by weight of the butene-1 copolymer and the butene-1 copolymer constituting 20-50% by weight of the core layer, said film having a Z-axis strength greater than 93 g/in, a shrinkage of at least 20% in at least one of a machine direction and a transverse direction of formation when said film is heated to a temperature of 80° C.

2. The oriented, multilayer shrink film of claim 1, said film having a density of less than 1 g/cm$^3$.

3. The oriented, multilayer shrink film of claim 1, said film being biaxially oriented.

4. The oriented, multilayer shrink film of claim 1, said film being biaxially oriented in the machine direction and transverse direction of formation, with a greatest orientation being in the transverse direction of formation.

5. The oriented, multilayer shrink film of claim 1, said film being uniaxially oriented.

6. The oriented, multilayer shrink film of claim 1, said film being uniaxially oriented in the transverse direction of film formation.

7. The oriented, multilayer shrink film of claim 1, said film being clear and having a haze of less than 5%.

8. The oriented, multilayer shrink film of claim 1, said film being opaque.

9. The oriented, multilayer shrink film of claim 1, said film being opaque and wherein the core layer is voided.

10. The oriented, multilayer shrink film of claim 1, said film being opaque and including a whitening agent therein.

11. The oriented, multilayer shrink film of claim 1, said film being opaque, said core layer being voided and said film including a whitening agent therein.

12. The oriented, multilayer shrink film of claim 1, wherein said olefin polymer is not a polybutene-1 copolymer.

13. The oriented, multilayer shrink film of claim 1, wherein said olefin polymer is a polypropylene polymer.

14. The oriented, multilayer shrink film of claim 1, wherein said olefin polymer is a propylene, ethylene, butene terpolymer with propylene constituting over 50% by weight of the terpolymer.

15. The oriented, multilayer shrink film of claim 1, including a skin layer on each side of said core layer, wherein said skin layer on each side of the core layer and the core layer are the only layers of said film.

16. The oriented, multilayer shrink film of claim 1, including more than three layers, said layers including the core layer and a skin layer on each side of said core layer.

17. The oriented, multilayer shrink film of claim 1, said film having a shrinkage in one direction of formation of at least 30% when heated in the temperature range of 90-100° C.

18. The oriented, multilayer shrink film of claim 1, said film having a shrinkage in the transverse direction of formation of at least 30% when heated in the temperature range of 90-100° C.

19. The oriented, multilayer shrink film of claim 1, said film having a shrinkage in one direction of formation of at least 50% when heated in the temperature range of 93-97° C.

20. The oriented, multilayer shrink film of claim 1, said film having a shrinkage in the transverse direction of formation of at least 50% when heated in the temperature range of 90-100° C.

21. The oriented, multilayer shrink film of claim 1, said film having a shrinkage in the transverse direction of formation of at least 50% when heated in the temperature range of 93-97° C.

22. The oriented, multilayer shrink film of claim 1, said core layer further including a hard resin therein.

23. The oriented, multilayer shrink film of claim 1, wherein said olefin polymer is not a polybutene-1 copolymer, said core layer further including a hard resin therein.

24. The oriented, multilayer shrink film of claim 1, wherein said olefin polymer is a polypropylene polymer, said core layer further including a hard resin therein.

25. The oriented, multilayer shrink film of claim 1, said cyclic-olefin copolymer in said at least one skin layer including a copolymer of ethylene and norbornene.

26. The oriented, multilayer shrink film of claim 1, including a skin layer on each side of said core layer, wherein said skin layer on each said of said core layer comprises a cyclic olefin copolymer including a copolymer of ethylene and norbornene.

27. The oriented, multilayer shrink film of claim 1, wherein said core layer has a thickness of at least 20 microns and said at least one skin layer has a thickness of greater than 5 microns.

28. The oriented, multilayer shrink film of claim 2, said core layer further including a hard resin therein.

29. The oriented, multilayer shrink film of claim 1, said core layer further including a hard resin therein, said hard resin being a dicyclopentadiene based hard resin.

30. The oriented multilayer shrink film of claim 1, wherein said core layer further includes reclaim comprising a reclaim core layer and at least one reclaim skin layer formed from the same components as the core layer and the at least one skin layer of the film.

31. The oriented multilayer shrink film of claim 1, wherein said olefin-based elastomer is a propylene-ethylene elastomeric copolymer.

32. The oriented multilayer shrink film of claim 1, wherein said olefin-based elastomer is a styrenic-based block copolymer.

33. The oriented multilayer shrink film of claim 1, wherein the Z-axis strength of the film exceeds a maximum value measurable in a delamination test.

34. The oriented multilayer shrink film of claim 1, wherein the Z-axis strength of the film is 146-289 g/in.

35. The oriented multilayer shrink film of claim 1, wherein said core layer further comprises 10-40 wt. % reclaim.

36. A container label comprising the film of claim 1.

37. The container label of claim 36, said label being in a form of a sleeve having a circumferential direction configured to surround a periphery of a container and a transverse direction substantially normal to said circumferential direction, said circumferential direction being shrinkable when exposed to a desired temperature to closely conform to a configuration of the container and said transverse direction having no shrinkage or minimal shrinkage when said label is exposed to said desired temperature.

38. The container label of claim 37, said circumferential dimension being the transverse dimension of the film from which said label is formed.

* * * * *